United States Patent [19]
Shinohara et al.

[11] 3,976,034
[45] Aug. 24, 1976

[54] METHOD FOR PRODUCING A COMBUSTIBLE GAS BY PARTIAL OXIDATION FOR USE IN INTERNAL COMBUSTION ENGINES

[75] Inventors: Hiroshi Shinohara, Okazaki; Kunihiko Masunaga, Toyota; Toshihito Kondo, Toyota; Kazuhiko Ishiguro, Toyota, all of Japan

[73] Assignee: Toyota Jidosha Kogyo Kabushiki Kaisha, Toyota, Japan

[22] Filed: Jan. 25, 1974

[21] Appl. No.: 436,449

[30] Foreign Application Priority Data
Jan. 30, 1973  Japan............ 48-12200

[52] U.S. Cl.................. 123/1 A; 123/3; 123/119 E; 48/197 FM; 48/199 FM
[51] Int. Cl.² .......................... F02B 43/04
[58] Field of Search....... 123/3, 34 R, 34 A, 119 E, 123/191 A; 23/288 B, 288 K; 48/197 R, 197 FM, 199 R, 199 FM, 211, 212, 213, DIG. 8

[56] References Cited
UNITED STATES PATENTS

| | | | |
|---|---|---|---|
| 1,777,554 | 10/1930 | Ducloux............................ | 123/119 E |
| 1,989,927 | 2/1935 | Houdry............................. | 23/288 B X |
| 2,201,965 | 5/1940 | Cook................................ | 123/119 E X |
| 2,295,209 | 9/1942 | Guiles et al....................... | 123/3 X |
| 2,759,805 | 8/1956 | Erickson et al.................... | 48/212 X |
| 3,471,274 | 10/1969 | Quigley, Jr. et al................ | 123/119 E X |
| 3,717,129 | 2/1973 | Fox.................................. | 123/119 E X |
| 3,828,736 | 8/1974 | Koch................................ | 123/3 |
| 3,849,087 | 11/1974 | Arakawa et al.................... | 48/213 X |
| 3,871,838 | 3/1975 | Henkel et al...................... | 123/3 X |
| 3,930,476 | 1/1976 | Koch................................ | 123/119 E |

Primary Examiner—Charles J. Myhre
Assistant Examiner—Tony Argenbright
Attorney, Agent, or Firm—Oblon, Fisher, Spivak, McClelland & Maier

[57] ABSTRACT

A method of operating an internal combustion engine with a combustible gas which comprises the steps of: transforming a refined product of crude oil into a combustible gas in a gas generator by admitting said refined product into said gas generator with 60–120 % of the stoichiometric volume of oxygen needed to oxidize said refined product under the partial oxidation conditions of 400~800°C with a space velocity ranging from 5000~50,000 V/VC × hr⁻¹; passing the combustible gas produced to an internal combustion engine to start and operate said internal combustion engine; and discharging the exhaust gases from said internal combustion engine.

9 Claims, 2 Drawing Figures

METHOD FOR PRODUCING A COMBUSTIBLE GAS BY PARTIAL OXIDATION FOR USE IN INTERNAL COMBUSTION ENGINES

BACKGROUND OF THE INVENTION

1. Field of the Invention

The present invention relates to a method for forming a combustible gas from a refined product of crude oil. More particularly, the invention relates to a method of operating an internal combustion engine with the combustible gas to reduce harmful automobile emissions.

2. Description of the Prior Art

Recently, air pollution caused by the exhaust gas emissions from internal combustion engines, particularly gasoline engines has become a serious public concern. In order to solve this problem, various procedures have been developed and placed in practice such as the reduction of engine compression ratios, the burning of fuel in the presence of excess amounts of air, the adjustment of ignition timing and other engine controls, and the use of special devices such as positive crankcase ventilators, exhaust gas recirculators, catalytic mufflers and exhaust manifold reactors. These measures, however, have not been able to satisfactorily solve the exhaust gas emission problem. These techniques also have the disadvantages of having complicated structures, they use expensive, precious metals such as palladium or platinum, or they have limited durability.

Other procedures for solving the pollution problem have focused on modifications of the fuels used. However, the modifications that would be required for the refineries would involve enormous costs. Even with these changes, however, there would still be no significant changes in the quality of gasoline marketed.

Recently, other fuels such as natural gas and LPG have received attention as possible fuels for automobile engines. The use of these fuels has met with a degree of success in reducing automobile emissions. However, the use of natural gas or LPG in automobile engines requires pressure vessels for storage of the gases. In addition, the methods of supply of the gases involve hazards. Also, compressors for compressing the gases as well as storage tanks are required. Thus the use of natural gas or LPG in automobile engines in an additional heavy economic burden, although these fuels are effective in mitigating the exhaust gas emissions in comparison to gasoline.

A need, therefore, continues to exist for a method of satisfactorily reducing the pollutants in automobile emissions.

SUMMARY OF THE INVENTION

Accordingly, one object of the present invention is to provide a method of reducing harmful exhaust gas emissions from automobiles.

Another object of the invention is to provide a combustible gas from refined products of crude oil.

Yet another object of the invention is to provide a method of operating an internal combustion engine on a combustible gas to reduce automobile exhaust gas emissions.

Briefly, these objects and other objects of the invention as hereinafter will become more readily apparent can be attained by a method of operating an internal combustion engine with a combustible gas, which comprises the steps of: transforming a refined product of crude oil into a combustible gas in a gas generator by admitting said refined product into said gas generator with 60 – 120% of the stoichiometric volume of oxygen needed to oxidize said refined product under the partial oxidation conditions of 400~800°C with a space velocity ranging from 5000~50,000 V/VC × hr$^{-1}$; passing the combustible gas produced to an internal combustion engine to start and operate said internal combustion engine; and discharging the exhaust gases from said internal combustion engine.

DETAILED DESCRIPTION OF THE PREFERRED EMBODIMENTS

Figure 1:
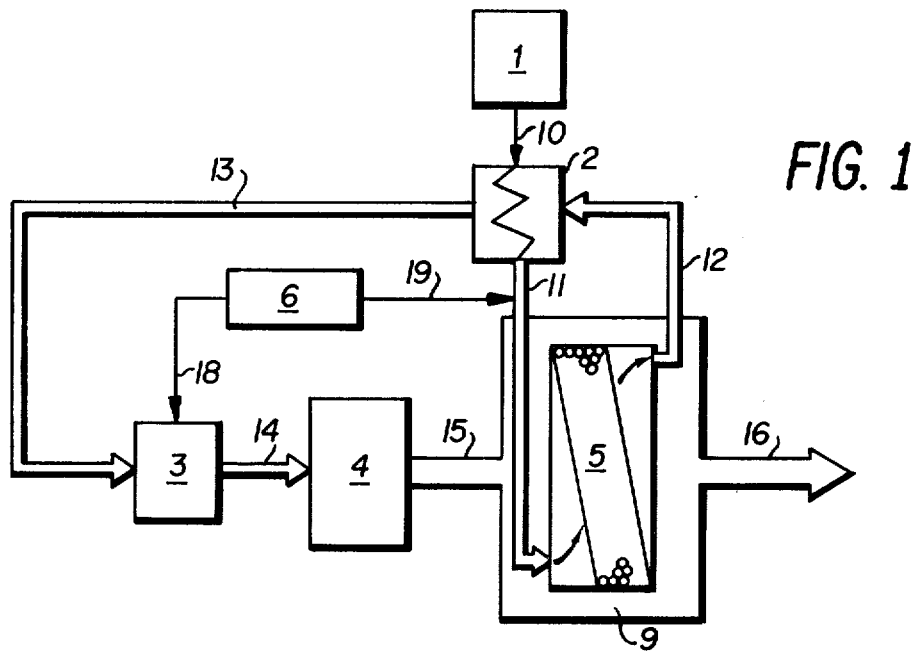

Usually, when natural gas or LPG are used in automobile engines, poor suction efficiency results with a resultant decrease in output. The feature of the present invention is that even non-reacting materials such as liquid hydrocarbons, including gasoline and distillate oil which cannot be transformed into combustible gases, are supplied to the engine, which prevents any decrease in the engine's output. Also, no apparatus is needed for disposal of the exhaust gas, and as illustrated in the drawings, the internal combustion engines can be started simply and economically.

In one embodiment of the invention as shown in FIG. 1, fuel is introduced from fuel tank 1 into fuel pipe 10, heated in the heat exchanger 2, and then passed through pipe 11. The fuel, together with the air introduced into the duct 19 through the air cleaner 6, goes into the heat exchanger 9 which contains built-in gas generator 5. The fuel is heated in the heat exchanger and transformed into a combustible gas by partial oxidation in the gas generator 5.

The combustible gas then goes through the pipe 12, is cooled by the heat exchanger 2 and then passes through pipe 13 into the carburetor 3 which contains air which has come through duct 18 from the air cleaner 6. The mixture of the combustible gas and air, supplied through the intake manifold 14, starts the engine 4. The exhaust gases from the combustion in engine 4 pass through exhaust manifold 15 into the heat exchanger 9, in which is contained gas generator 5, where the gases heat gas generator 5 and the pipe 11 for the fuel-air mixture. The exhaust gas then passes from heat exchanger 9 and exits through the pipe 16.

Figure 2:
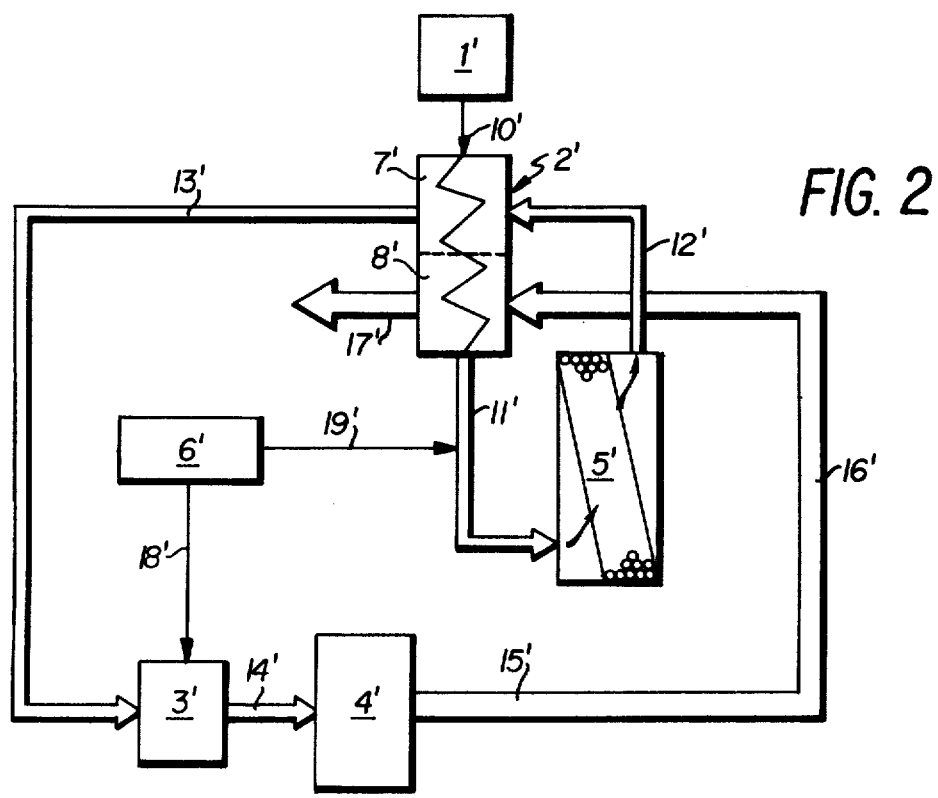

In a second embodiment of the invention as shown in FIG. 2, the fuel is introduced from the fuel tank 1' through the fuel pipe 10' into the heat exchanger 2' consisting of an upper layer and a lower layer where the fuel is heated. The fuel then passes into the pipe 11'. The fuel, together with the air passed into the duct 19' through the air cleaner 6', flows into the gas generator 5' where it is transformed into a combustible gas.

The combustible gas flows through the pipe 12' into the top layer 7' of the heat exchanger 2' where it is cooled. The gas then flows through the pipe 13' into the carburetor 3' into which air is taken via the duct 18' from the air cleaner 6'.

The mixture of the combustible gas and air, supplied through the intake manifold 14' starts the engine 4'. The exhaust gas from the combustion process in the engine 4', passes through the exhaust manifold 15' and the duct 16' into the bottom layer 8' of the double layer heat exchanger 2' where the fuel already heated in the top layer 7' is again intensely heated.

Suitable fuels for the present invention include refined products of crude oil such as LPG, gasoline, distillate oil, kerosene and fuel oil; alcohols such as methyl alcohol, ethyl alcohol, propyl alcohol and butyl alcohol; aromatic hydrocarbons such as benzene, toluene, xylene, mesitylene and ethylbenzene; saturated hydrocarbons such as ethane, propane, butane, pentane, hexane, heptane, octane, cyclopentane and cyclohexane; and unsaturated hydrocarbons such as acetylene, ethylene, propylene, butene, pentene, hexene and heptene. Among these fuels, the most preferred are gasoline, light oil, heating oil, benzene, toluene, hexane, isooctane, hexene, cyclohexane, methyl alcohol and ethyl alcohol.

The partial oxidation of the fuel may be expressed as a partial oxidation reaction or CO generating reaction as shown by equation (i). Equations (ii) and (iii) represent secondary reactions which also have been observed.

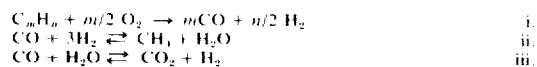

$$C_nH_m + m/2\ O_2 \rightarrow mCO + n/2\ H_2 \qquad \text{i.}$$
$$CO + 3H_2 \rightleftarrows CH_4 + H_2O \qquad \text{ii.}$$
$$CO + H_2O \rightleftarrows CO_2 + H_2 \qquad \text{iii.}$$

The volume of oxygen added to the fuel in the partial oxidation reaction can be determined from equation (iv) and consequently the volume of air can be calculated from the volume of oxygen added.

$$\text{Ratio of oxygen added (\%)} = X/Y \times 100 \qquad \text{iv.}$$

wherein
 $X$ = volume of oxygen added (g/1 mole of fuel);
 $Y$ = stoichiometric volume of oxygen needed to partially oxidize the fuel (g/1 mole of fuel).

The ratio of oxygen added in the industrial generation of combustible gases from the fuel is usually about 100~150%, and therefore, a catalyst is used. In the present invention, the available range of the oxygen added is 5~150%. At oxygen ratios less than 20%, carbon is likely to precipitate on the walls of the tube of the gas generator with a resultant decrease in the volume of gas produced. If the oxygen ratio exceeds 130%, the quantities of carbon dioxide or unreacted oxygen may increase. However, no great increases in the volume of combustible gas can be achieved.

In both of the operable embodiments of the invention, the most favorable exhaust gas conditions were obtained when the ratio of oxygen was 60~120%.

In the operation of the system, the fuel in the heat exchanger is usually heated to 200°~1200°C. If the temperature is below 200°C, the partial oxidation of the fuel is slow which results in only a relatively small amount of gas generation.

If the temperature is over 1200°C, the content of carbon dioxide in the gas increases, the thermal decomposition intensifies, and the precipitation of carbon increases which results in a decrease in the gas energy density and of the output. At temperatures ranging from 1000° to 1200°C, the red-hot tube wall of the gas generator induces thermal decomposition of the hydrocarbons which results in reduced levels of generation of the combustible gas and an uncertainty concerning the gas composition. At temperatures ranging from 200° to 300°C, kerosene and fuel oil do not readily evaporate and substantially reduced levels of conversion of the oils into a combustible gas results. Alcohols and lower hydrocarbons, however, readily evaporate at these temperatures and are readily converted into a combustible gas, even at 200°~300°C. Lower hydrocarbons are useful as a fuel, but they are easily affected by the temperature of the partial oxidation conditions. Therefore, the optimum temperature for these materials ranges from 400° to 800°C.

A catalyst for the partial oxidation of the fuel is not always necessary for the gas generator of the present invention. However, a more efficient generation of combustible gas is possible in the presence of catalysts. Suitable catalysts for the conversion reaction include transition metals such as nickel, iron, cobalt, chromium, platinum, tungsten, rhodium, molybdenum, palladium, uranium, rhenium and oxides of these elements. Suitable reaction promoters include the oxides, carbonates and nitrates of alkali metals such as lithium, sodium, potassium and cesium and alkaline earth metals such as beryllium, magnesium, calcium, barium and strontium.

Suitable carriers for supporting the catalysts include alumina, silica, magnesia, dolomite, zeolite, cement and brick (procelain or pottery).

In the tests of the combustion system, it has been found that the best results can be obtained when the catalyst is nickel oxide supported on alumina or silica, and the reaction promoter is an oxide of calcium, magnesium or vanadium.

The use of inorganic heat-resistant substances such as glass wool or stainless steel balls as a filler material for the gas generator is also very effective. A further useful improvement is the installation of a partition, wall or baffle wall made of chamotte brick, agalmatolite brick, magnesium brick, chrome brick or carborundum brick in the gas generator.

It is undesirable that the volume of oxygen supplied to the gas generator be less than 60% of its stoichiometric volume because volumes less than that increase the amount of carbon generated, decrease the amount of gas generated, thus decreasing the calorific value of the gas which consequently lowers the reaction temperature and slows down the rate of reaction. If, however, the stoichiometric volume of the oxygen exceeds 120%, the content of the non-combustible $CO_2$ and $N_2$ components in the generated gas increase and quantities of unreacted oxygen are present in the gas which is very dangerous. Also, the presence of oxygen in the combustible gas increases the calorific value of the gas while it accelerates the deterioration of the catalyst. Thus, the stoichiometric volume of the gas should be limited to the range of 60 to 120%.

If the reaction temperature is less than 400°C the rate of reaction decreases which results in a decrease in the amount of gas generated, the reactivity is lower, which results in an increase in the amount of unreacted hydrocarbons, and carbon begins to precipitate, which is not desirable. If the reaction temperature is allowed to exceed 800°C, the hydrocarbon fuel undergoes normal decomposition which results in an increase of the non-combustible $CO_2$ component in the generated gas and instability concerning the amount and composition of the generated gas. Also, the heat resistance of the catalyst becomes questionable. Thus, the optimum reaction temperature ranges from 400° to 800°C.

As for the space velocity of the gases within the gas generator, velocities less than 500 V/VC × hr$^{-1}$ are not desirable, because at these velocities relatively large amounts of catalyst are needed and accordingly the capacity of the reactor has to be larger. Velocities greater than 50,000 V/VC × hr$^{-1}$ are equally undesirable, because at these velocities the progress of the reaction is insufficient which results in an increased content of the unreacted hydrocarbons, a decrease in the amount of generated gas and an increase in the amount of precipitated carbon. Also the durability of the catalyst is questionable. Thus, the optimum space velocity ranges from 5000 to 50,000 V/VC × hr$^{-1}$ (V is defined as the volume (liters) of gas material flowing over the catalyst per hour and VC is defined as the volume of catalyst in liters.).

In the absence of a catalyst in the gas generator, precipitation of carbon can be prevented by optimizing the volume of added air.

After the combustible gas is generated in the gas generator, it is cooled in the heat exchanger and sent to the engine where, of course, ignition takes place.

The composition of the combustible gas produced in the gas generator which varies depending upon the partial oxidation conditions, is generally as follows in the absence of a catalyst: hydrogen 10~40%, carbon monoxide 30~75%, methane 20~60%, dry gases other than methane ($C_2$, $C_3$ gas distillate) 5~20%, and carbon dioxide 0~5%. If a catalyst is present in the gas generator for the partial oxidation conversion, the composition of the combustible gas is generally as follows: hydrogen 50~70%, carbon monoxide 20~30%, methane 5~15%, dry gases other than methane ($C_2$, $C_3$ gas distillate) trace, and carbon dioxide 0~2%.

The water content of the generated gas in the absence of catalyst or in the presence of a partial oxidation catalyst is in the range of 0 to 2 volume %.

The combustible gas cooled in the heat exchanger is mixed in the carburetor with an adquate amount of air. In ordinary gasoline engines the air/fuel ratio ranges from 7~16:1, but the stoichiometric air/fuel ratio, though variable depending upon the fuel composition is about 14:1.

The range of air/fuel ratios useful in the present invention is from 0.2~8:1. However, the lower ratios are effective for anti-pollution purposes, the optimum ranging from 1 to 6.

The combustible gas of the present invention has a high spontaneous ignition point and a wide explosive range. Therefore, it can be used both as a lean mixture and as a rich mixture. These properties of the combustible gas of the present invention is found useful.

The vaporous mixture with the air/fuel ratio indicated above burns in the combustion chamber of the engine thereby, of course, developing engine power and emitting burned exhaust gas. The composition of the harmful elements in the burned exhaust gas can be reduced by the procedure of the present invention to the same levels achieved when the engine is run under the steam cracking conditions disclosed in SAE Paper No. 680769 by R. C. Lee and D. B. Wimmer (published 1968 by SAE) wherein n-hexane was burned at 1,000° F (540°C) at 3.4 atms pressure with a steam/hexane weight ratio of 1.71 Lb/Lb. Under these operating conditions a clean exhaust was produced of 2.52 g/mile of NO, 0.86 g/mile of hydrocarbons and 1.59 g/mile of CO. R. C. Lee and others have called this exhaust gas composition a "clean-exhaust". In the present invention, the clean exhaust passes through the exhaust manifold where it subsequently preheats the gas generator or the gas mixture, and then exits the system.

Having generally described this invention, a further understanding can be obtained by reference to certain specific examples which are provided herein for purposes of illustration only and are not intended to be limiting unless otherwise specified.

EXAMPLE 1

A combustible gas was formed in an apparatus described in the first embodiment of the invention and then burned in an internal combustion engine 4. The combustible gas was formed by admitting n-hexane and air into the gas generator which was maintained at a temperature of 700°C. The temperature of the gas mixture, i.e., n-hexane and oxygen added as air (50% oxygen ratio) in the entrance to the gas generator was 350°C. The gas mixture was partially oxidized over a catalyst in the generator and the composition of the resulting gas was 36 vol % hydrogen, 40 vol % nitrogen, 6 vol % methane, 17 vol % carbon monoxide, and 1 vol % carbon dioxide. The composition of the combustible gas in the absence of a catalyst was 11 vol % hydrogen, 46 vol % nitrogen, 15 vol % methane, 16 vol % carbon monoxide, 9 vol % dry gases other than methane and 3 vol % carbon dioxide.

EXAMPLE 2

When the system described in the second embodiment was operated under the same conditions described in Example 1, no great difference was found in the compositions of the combustible gas and the generated gas obtained in comparison to the system of Example 1.

In the first and second embodiments of the invention, full transformation of fuel into combustible gases in internal combustion engine systems is illustrated. In an alternative situation a mixture of combustible gases containing partially unreacted hydrocarbons, instead of a gas consisting of a fully transformed fuel can be used in order to improve the power output of an engine by increasing the efficiency of suction into the combustion chamber of the engine.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method of operating an internal combustion engine with a combustible gas, which comprises the steps of: transforming a refined product of crude oil into a combustible gas characterized by a composition comprising 10% – 70% hydrogen, 20% – 75% carbon monoxide, 5 – 60% methane, 0 – 5% carbon dioxide, and up to 20% dry hydrocarbon gases in a generator by admitting said refined product into said gas generator with 60 – 120% of the stoichiometric volume of oxygen needed to oxidize said refined product under the partial oxidation conditions of 400°~800°C with a space velocity ranging from 5000 ~ 50,000 V/VC × hr$^{-1}$; passing the combustible gas produced to an internal combustion engine to start and operate said internal combustion engine; and discharging the exhaust gases from said internal combustion engine.

2. The method of claim 1, wherein said refined product is oxidized with said oxygen in said gas generator in the presence of a catalyst.

3. The method of claim 1, wherein said exhaust gases are sent to said gas generator to heat said gas generator before said exhaust gases are discharged.

4. The method of claim 1, wherein said exhaust gases are sent to a heat exchanger to heat said heat exchanger before said exhaust gases are discharged.

5. The method of claim 1, which further comprises: cooling said combustible gas in a heat exchanger; passing said cooled combustible gas to a carburetor; passing said cooled combustible gas from said carburetor into said internal combustion engine together with air from an air cleaner to start the engine; discharging the exhaust gas from the engine to a heat exchanger which contains a gas generator; heating an air and fuel mixture within said gas generator with said discharged exhaust gas; and discharging said exhaust gas into the atmosphere.

6. The method of claim 1, which further comprises: cooling said gas in the upper layer of a heat exchanger which contains an upper and lower layer; passing said cooled combustible gas into a carburetor; passing the combustible gas from said carburetor into said internal combustion engine together with the air from an air cleaner; starting and operating said engine with said combustible gas and air; passing the evolved exhaust gases from said operating engine into the lower layer of said heat exchanger, whereby the combustible gas present in the upper layer of said heat exchanger is more intensely heated; and discharging the exhaust gas from the heat exchanger into the atmosphere.

7. The method of claim 2, wherein said catalyst is nickel, iron, cobalt, chromium, platinum, tungsten, rhodium, molybdenum, palladium, uranium, rhenium or oxides thereof.

8. The method of claim 2, wherein said catalyst is combined with a reaction promoter selected from the group consisting of the oxides, carbonates and nitrates of sodium, lithium, cesium, potassium, magnesium, beryllium, calcium, strontium and barium.

9. The method of claim 2, wherein said catalyst is supported on a silica, alumina, magnesia, dolomite, zeolite, cement or brick carrier.

* * * * *